Patented Dec. 18, 1928.

1,695,693

UNITED STATES PATENT OFFICE.

HENRY R. LADISLAUS, OF LOS ANGELES, CALIFORNIA.

COMPOSITION OF MATTER.

No Drawing. Application filed July 8, 1924. Serial No. 724,897.

This invention relates to compositions of matter, and more particularly for the purpose of cleaning and polishing wood, metal, leather, glass, enamel and various manufactured products such as furniture, automobiles and pianos.

The invention has among its objects the provision of a new composition of matter which will impart a superior finish to a surface which will first be thoroughly cleaned, which will dry quickly, which may be conveniently and quickly applied, and which will be generally superior in efficiency and serviceability, as well as inexpensiveness.

With the above and other objects in view, the invention consists in the novel and useful provision, combination, association, inter-relation, admixture, and composition of ingredients and elements, all as hereinafter disclosed and finally pointed out in claim.

The new composition of matter preferably includes hydrochloric acid, U. S. P. standard, glycerine, antimony in pulverized form, oil of mirbane, vinegar of apple cider, machine oil having the properties of machine oils, viz, a medium grade of lubricating oil lighter than cylinder oil and heavier than spindle oil, and water. The relative proportions of these ingredients may of course vary widely, but I have found in practice that preferred quantities of the various ingredients are as follows:

4 fluid ounces of hydrochloric acid;
4 fluid ounces of glycerine;
16 ounces of pulverized antimony;
4 fluid ounces of oil of mirbane;
1 gallon of vinegar made from apple cider;
1 gallon of machine oil;
½ gallon of water.

The machine oil, water and vinegar are preferably first mixed together. The hydrochloric acid and oil of mirbane, are next mixed together and added to the first mixture mentioned. The glycerine and pulverized antimony are then added to the other mixed ingredients.

A wide range of substitution and variation may of course be indulged in for the purposes of practicing the invention, and in departure from the ingredients and proportions of same above specified. The glycerine of course is an example of hygroscopic materials.

All of the materials should be thoroughly shaken together and mixed, and the complete mixture should be shaken up every half hour or so until it assumes a milky appearance, when it is ready to be used and applied. The composition dries at once upon application and gives a glossy or glassy finish which is highly attractive and also produces a durable surface not readily scratched or marred or blurred.

As a cleaner for various objects and articles and surfaces and as a polish for furniture, metalware, enameled and other automobile surfaces, and enameled ware and leather, it is highly superior, and adds to the life of the material, as well as protecting it and enhancing its appearance.

Having thus disclosed my invention, I claim and desire to secure by Letters Patent:

A cleaning composition consisting of hydrochloric acid, glycerine, pulverized antimony, oil of mirbane, vinegar, and machine oil.

In testimony whereof, I have signed my name to this specification.

HENRY R. LADISLAUS.